Oct. 3, 1950 H. C. LAWRENCE, JR 2,524,199

TUNING INDUCTANCE FOR AUTOMATIC TUNING SYSTEMS

Filed Jan. 7, 1948

INVENTOR
HOWARD C. LAWRENCE, JR.
BY [signature]
ATTORNEY

Patented Oct. 3, 1950 2,524,199

UNITED STATES PATENT OFFICE 2,524,199

TUNING INDUCTANCE FOR AUTOMATIC TUNING SYSTEMS

Howard C. Lawrence, Jr., Delaware Township, Camden County, N. J., assignor to Radio Corporation of America, a corporation of Delaware Application January 7, 1948, Serial No. 1,031

8 Claims. (Cl. 171—777)

This invention relates to tuning inductances for automatic tuning systems as used in a radio transmitter.

The purpose of this invention is to provide an improved novel modified inductance-turns characteristic in a tuning inductance for automatic tuning systems.

A feature of this invention is the novel means of spreading out the normal inductance-turns ratio at one end of the tuning coil so that the percent change will be small at the low inductance end of the coil. This feature is particularly desirable for use in automatic tuning systems of a radio transmitter.

The improved inductance system of this invention includes a rotatable coil suitable for use in a conventional roller coil adjustable inductance system with provisions for having the coil inductance vary approximately logarithmically with respect to the number of turns in the active section of the coil.

As well known to those skilled in the art, a rotatable coil as conventionally used in a radio transmitter consists of a coil mounted on a form usually of ceramic material which is in turn mounted on a shaft in such a way that the complete coil can be rotated. Slip rings and brushes at each end of the coil form provide contact to the ends of the coil and a slider or roller is arranged to contact one turn of the coil, the position of the contact being varied by rotation of the coil which provides the variable contact. The slider is normally connected to one end of the coils so that it shorts out the turns between the variable contact and one end. The turns at the opposite ends of the coil are the active turns that are used for tuning purposes.

The use of the system of this invention enables the construction of automatic tuning circuits for a radio transmitter operating at a speed over five times that of the circuit of the prior art. without the special coil construction of this invention. It has been found that operating the rotatable coil at high speeds causes hunting with a normal coil. Operation at low speeds causes excessive tuning time. The construction of the coils of this invention improved the operation of the automatic tuning control by spreading out the normal turn ratio approximately logarithmically with respect to the number of turns in the active or tuning section of the coil.

This invention will best be understood by referring to the accompanying drawings, wherein.

Figure 1:
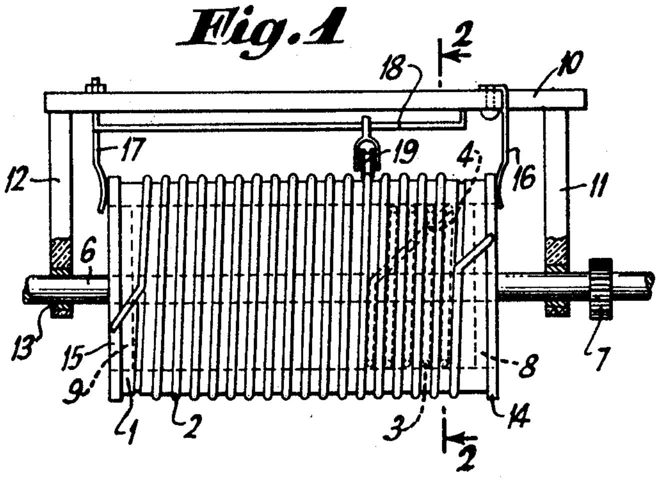
Fig. 1 is an elevation of the coil construction of this invention.
Figure 2:
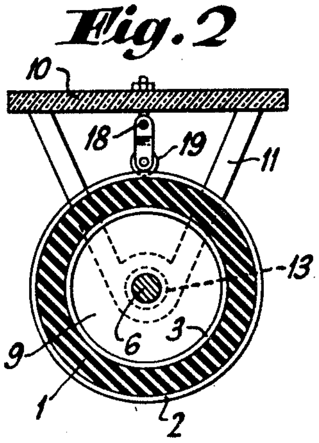
Fig. 2 is an end view of Fig. 1.

Referring now in detail to Figs. 1 and 2 of the drawings, a rotatable cylindrical coil form 1 is composed of ceramic material having formed grooves in which the helical coil 2 is wound. The coil 2 is preferably composed of fifteen turns of Number 14 copper wire, preferably silver plated. The turns are spaced apart approximately in the same diameter as the wire in the grooves on the coil form 1. An internal coil 3 is secured and wound concentrically within the main coil 2 and is cross-connected by means of a conductor 4; that is, the left hand end of the internal coil is connected to the right hand end of the external coil and vice versa.

Figure 3:
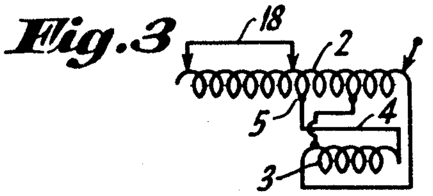
Fig. 3 is a circuit diagram showing the connections of the coils shown in Figs. 1 and 2.

As illustrated in Fig. 3, the internal coil 3 is connected across only a few turns of the main coil 2, the proper connection being indicated by the tap 5. If it is desired to obtain a different inductance turns ratio, several separate internal coils can be used instead of the single internal coil to accomplish the results desired. The coil form 1 is mounted for rotation on a shaft 6 having a pinion gear 7 for coupling to any suitable driving means (not shown), for example, such as an electric motor which may be remotely controlled. Insulating end members 8 and 9 support the coil 1 on shaft 6. An insulating base member 10 is located directly above coil 1 and has two mounting brackets 11 and 12 which are provided with suitable bearings 13 for the rotatable shaft 6. Each end of coil 1 has located thereon contact slip rings 14 and 15 which are electrically connected to the ends of the coil 2. Brushes 16 and 17 are located at each end of base 10 to provide contact with the slip rings. A slider rod 18 and a roller contact member 19 are arranged to contact one turn portion of the coil, the position of the contact with respect to the turns of coil 1 being varied by the rotation of shaft 6. The slider 18 is normally connected to one end of the coil by brush 17 so that it shorts out the turns between the variable contact 19 and the end brush 17. The turns at the opposite ends of the coil are the active turns that are used for tuning purposes.

Figure 7:
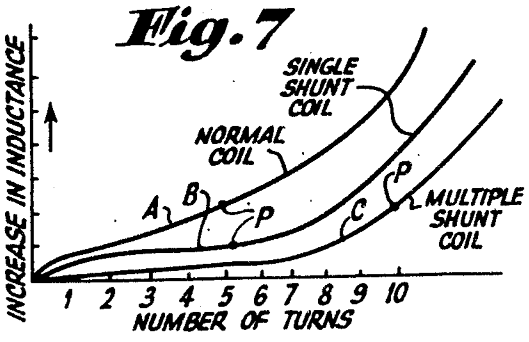
Fig. 7 is a graphic showing of the inductance increase with respect to the coil turns.

In the operation of the coil of this invention, reference is made to the curve shown by Fig. 7. A conventional prior art type of coil will give an inductance-turns characteristic similar to that shown by the curve A. It will be noted that in prior art constructions of a normal coil, the inductance is increased quite rapidly as the number of active turns rises. Certain types of automatic tuning systems, such as those remotely driven by electric motors, become more critical as the number of active turns is decreased. This is easily understood when it is realized that when only three turns are in use a change of one turn constitutes an inductance change of 33% of the total coil, whereas when twenty turns are in use an inductance change of one turn constitutes a variation of 5%.

According to this invention, it is desirable to have the inductance-turns characteristic such that the inductance change per turn is considerably reduced over that normally obtained when only a few turns are in the active tuning circuit. This is accomplished in the present invention by providing the internal coil 3 which is connected across appropriate portions of the external coil 2, as shown by the tap 5 in Fig. 3. If a single coil 3 is used, the inductance-turns characteristic is such as shown by the curve B. It will be noted that with this construction the inductance rises more slowly than with the normal coil shown by curve A, and then drops slightly as indicated at point P, at which location the internal coil 3 is connected to the external coil. After point P is passed, the inductance curve rises parallel to the normal coil characteristic. By providing several connections between the internal coil and the external coil and positioning these connections at proper points, a characteristic curve such as is shown in curve C can be obtained. The lower part of curve C may be as flat as desired, even to the point of having no change in inductance with an increasing number of turns. Several separate concentric internal coils can be used instead of a single internal coil to achieve the results desired. Where maximum flatness is not desired, the internal coils may be mounted on small coil forms placed at right angles to the axis of the main coil, as shown by the construction of Figs. 4 and 5.

Figure 4:
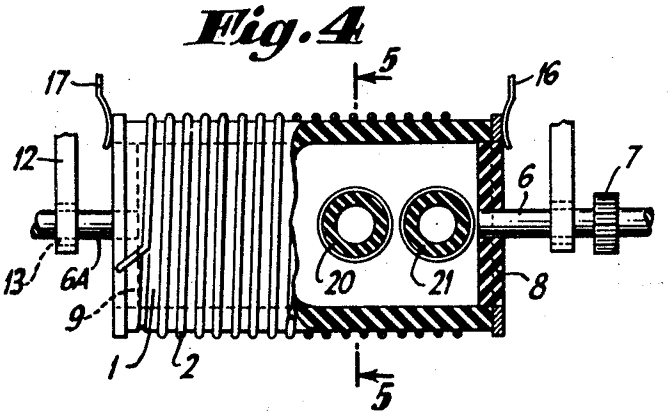
Fig. 4 is an elevation, partly in section, of another form of coil construction.
Figure 5:
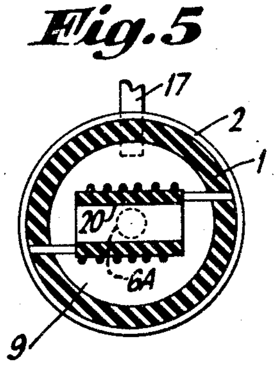
Fig. 5 is an end view of Fig. 4.
Figure 6:
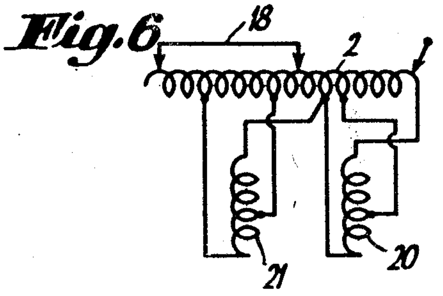
Fig. 6 is a circuit diagram showing the connections of the coils.

In the particular embodiment of the invention as shown by Figs. 4 and 5, the coil form, end supports, contact, and sliding members are of the same construction as illustrated in Figs. 1 and 2. The shaft 6A is made shorter than the shaft 6 of Fig. 1. Shaft 6A is provided with bearings 13. The main coil form 1 is approximately one and one-quarter inches in diameter and has fifteen turns of Number 14 wire, spaced the diameter of the wire in grooves on the coil form 2. The coil form is about five inches long. Two internal coils 20 and 21 are wound with the same size wire and have similar spacing to that of the main coil 2. The internal coils have a diameter of approximately one-half inch and are mounted within the main coil at right angles to the central axis thereof. The small internal coils are about one inch long. The small internal coils have about eight turns each, with a tap at three turns for one end. They are mounted perpendicular to the axis of the main coil, by any suitable means (such as, for example, by being held by leads, or cemented), and are connected (shown in Fig. 6) as follows: Coil 20 has one end connected to the right hand end of the main coil 1; the three turn tap to the fourth turn of the main coil; and the opposite end of the small coil to the fifth turn of the main coil. The second internal small coil 21 is of identical construction to that of the first coil 20 and is connected as follows: One end of the coil to the fifth turn of the main coil, the three turn tap to the eighth turn on the main coil, and the opposite end of the small coil at the twelfth turn.

Because of the rotation of the coil form 1, it is not possible to use external coils.

What is claimed is:

1. An inductance tuning system comprising a rotatable coil of the type having contact rings associated therewith, contact means on the turns of said rotatable coil for varying the inductance by the rotation of said coil, a second coil secured to and wound within said rotatable coil, a connection from an intermediate turn portion of said rotatable coil to an end of said second coil, a connection from one of the turns of said second coil to another intermediate turn portion of said rotatable coil, and a connection from an end of each coil to one of said contact rings whereby upon rotation of said rotatable coil the variable inductance of the tuning system gives a small percent change of inductance at the low inductance end of the first mentioned coil.

2. An inductive tuning system for a radio transmitter comprising a rotatable coil having conductor turns, conductor turn contact means for varying the inductance of said coil by the rotation thereof, means for shorting out the undesired turns of said rotatable coil, a second coil secured to and positioned within said rotatable coil and connected in shunt with portions thereof by a connection from an intermediate portion of the conductor turns of said rotatable coil to an end of said second coil, and a connection from one end of each one of said coils to an external circuit.

3. A variable tuning system for automatic tuning of a radio transmitter comprising a rotatable coil form having a conductor turn contact assembly portion, a helical inductance of conductor turns mounted for rotation adjacent said contact assembly on said coil form, means for shorting out undesired conductor turns comprising a connection from one end of said rotatable coil to the contact assembly, an output connection from said contact assembly, a second coil secured to and wound within said rotatable coil form, a connection from an intermediate conductor turn portion of said rotatable coil form to an end of said second coil, and a second output connection from the common remaining ends of said coils.

4. An inductive tuning system for a radio transmitter comprising a rotatable coil having conductor turns and contact rings associated therewith, fixed contact means for the conductor turns to vary the inductance of said coil by the rotation thereof, a pair of coils of smaller diameter than that of said rotatable coil, connection means for placing said pair of coils in shunt with portions of said rotatable coil, and a connection from one of said coils to one of said contact rings.

5. An inductance tuning system comprising a rotatable coil of conductor turns supported by a ceramic cylinder, a contact ring located at each end of said ceramic cylinder, fixed conductor contact means for varying the inductance of said coil by rotation thereof, a rotatable shaft located within said coil, a second coil supported within said rotatable coil, a connection from an intermediate portion of said rotatable coil to an end of said second coil, and a connection from one end of each one of said coils to one of said contact rings.

6. An inductance tuning system comprising a rotatable coil of conductor turns supported by a ceramic cylinder, a contact ring located at each end of said ceramic cylinder, fixed conductor contact means for varying the inductance of said coil by rotation thereof, a rotatable shaft located within said coil, a second coil supported within said rotatable coil, a connection from an intermediate portion of said rotatable coil to an end of said second coil, and a connection from one end of each one of said coils to one of said contact rings.

7. An inductance tuning system comprising a rotatable coil supported by a ceramic cylinder, a contact ring located at each end of said ceramic cylinder, a brush for making contact with each one of said contact rings, fixed contact means for varying the inductance of said coil by the rotation thereof, a rotatable shaft located within said coil, a second coil secured within and at right angles to the axis of said rotatable coil, said second coil being connected in shunt with portions thereof by a connection from an intermediate portion of said rotatable coil to an end of said second coil, and a connection from the other end of said second coil to one of said contact rings.

8. Apparatus as described in claim 5 wherein said coil windings are connected differentially.

HOWARD C. LAWRENCE, Jr.

REFERENCES CITED

The following references are of record in the file of this patent:

UNITED STATES PATENTS

| Number | Name | Date |
|---|---|---|
| 2,163,644 | Ware | June 27, 1939 |
| 2,163,645 | Ware | June 27, 1939 |
| 2,175,928 | Steinert | Oct. 10, 1939 |

Certificate of Correction

Patent No. 2,524,199 October 3, 1950

HOWARD C. LAWRENCE, JR.

It is hereby certified that error appears in the printed specification of the above numbered patent requiring correction as follows:

Column 3, line 68, for the word "for" read *from*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*